(12) United States Patent
Garlaschelli et al.

(10) Patent No.: US 6,315,019 B1
(45) Date of Patent: Nov. 13, 2001

(54) TIRE WITH BELT STRUCTURE INCLUDING A PAIR OF LATERAL BANDS

(75) Inventors: Carlo Garlaschelli, Monza; Gaetano Lo Presti, Sesto San Giovanni, both of (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/252,067

(22) Filed: Feb. 18, 1999

Related U.S. Application Data
(60) Provisional application No. 60/087,101, filed on May 28, 1998.

(30) Foreign Application Priority Data

Feb. 19, 1998 (EP) ................................................... 98830078

(51) Int. Cl.$^7$ ............................... B60C 9/18; B60C 9/20; B60C 9/22

(52) U.S. Cl. .......................... 152/527; 152/526; 152/531; 152/532; 152/533; 152/534; 152/538

(58) Field of Search ..................................... 152/531, 526, 152/534, 527, 532, 533, 538

(56) References Cited

U.S. PATENT DOCUMENTS 4,696,335  9/1987  Tsukagoshi et al. .

FOREIGN PATENT DOCUMENTS

| 0 461 646 B1 | 12/1991 | (EP) . |
| 0 719 659 A2 | 7/1996 | (EP) . |
| 0 785 096 A1 | 7/1997 | (EP) . |
| 2 005 201 A | 4/1979 | (GB) . |
| 2 061 202 A | 5/1981 | (GB) . |
| 2 064 445 A | 6/1981 | (GB) . |

OTHER PUBLICATIONS

T. Shuichi, "Pneumatic Radial Tire", Patent Abstracts of Japan,—JP 60 255503, Dec. 17, 1985 (Abstract Only).

Primary Examiner—Adrienne C. Johnstone
(74) Attorney, Agent, or Firm—Finnegan, Henderson, Farabow, Garrett & Dunner, L.L.P.

(57) ABSTRACT

A radial tire is provided with a metal belt comprising two load-bearing strips, respectively a first one and a second one, with reinforcing elements inclined in opposite directions in the two strips relative to the equatorial plane, and a pair of lateral bands radially superimposed on the ends of the second strip. The second strip has an axial width less than the first one and has edges staggered axially inwards with respect to the edges of the first strip. Each band comprises a single layer of circumferential metal reinforcing elements and has its axially external edge staggered axially inwards with respect to the edge of the second strip. A third strip with inclined reinforcing elements is arranged in the radially outermost position of the belt and covers at least two thirds of the width of each band. The pair of bands covers at least partially the two ends of the second strip in a diverging configuration relative to the two ends of the first strip.

25 Claims, 2 Drawing Sheets

TIRE WITH BELT STRUCTURE INCLUDING A PAIR OF LATERAL BANDS

This application claims the benefit of U.S. Provisional Application No. 60/087,101 filed May 28, 1998.

The present invention relates to a tire for vehicle wheels and, more particularly, to a tire of the radial type which has an improved belt structure.

A radial tire usually comprises a torus-shaped carcass, a tread band located at the top of said carcass and moulded with a suitable pattern in relief, the so-called tread pattern, and a belt structure located between the carcass and tread.

The carcass is formed by at least one ply of rubberized fabric incorporating reinforcing elements, usually textile or metal cords, axially extending from one bead to the other one; in carcasses of the radial type, these cords lie in radial planes.

The belt structure in turn comprises radially superimposed strips of rubberized fabric which extend axially substantially over the entire width of the tread and incorporate reinforcing elements, usually textile or metal cords arranged parallel to one another in each strip and intersecting with those of the adjacent strip.

More specifically the invention relates to belt structures suitable for tires of heavy transportation vehicles, i.e. with a high load-carrying capacity, mainly for lorries, buses and the like, comprising reinforcing elements made of material with a high modulus, generally metal cords having breakage elongation values of between 2% and 3%.

Some of these structures are characterized by the fact that they have their ends inserted in a pair of rings of rubberized fabric, called "bands" hereinbelow, incorporating reinforcing elements, usually high-elongation metal cords extending in a direction substantially parallel to the equatorial plane of the tire.

The expression "high elongation" is used to indicate the capacity of the reinforcing elements to lengthen under strain to a substantial degree, at least initially, owing to the use of special materials and/or predetermined, specially chosen, geometrical shapes, so as to be able to satisfy particular stages of manufacture of the tire. and/or operating conditions thereof.

These reinforcing elements may therefore be wires or cords with high elongation properties which are arranged in linear form, or wires or cords with low elongation properties which are arranged in a form other than a linear form, for example in a zigzag or undulating form.

In particular these reinforcing elements may be made with the known metal cords of the "HE" (high elongation) type, having a breakage elongation value of between 4% and 10%, the characteristics of which have already been described in detail, for example in European Patent No. 0,461,646 in the name of the same Applicant.

The function of these bands is to achieve both correct moulding of the tread pattern, controlling expansion of the tire inside the vulcanization mould, and optimum behaviour during use, stopping expansion of the ends of the belt structure owing to the centrifugal effect.

More particularly, the function of the lateral bands is that of preventing the movements of the ends of the cords of the underlying belt strips, reducing to a minimum the shearing stresses caused by said movements, the effect of which would result in tearing of the rubber with consequent separation of the belt strips from one another and from the carcass ply.

In known tires provided with this type of belt, the lateral bands comprise two radially superimposed layers of metal cords wound onto a pair of belt strips with the axially external edge of the bands aligned with the edge of one of the two belt strips, for example with that of the radially innermost strip.

A tire of the type mentioned is described in the patent GB 2,061,202.

The presence of dual-layer bands in the belt results from the need to ensure a high strength of the structure in severe stress conditions created by running in bends.

In fact, during the run in bends, the impression area of the tire may be transformed from the elliptical configuration, which is typical of run in a straight line, into a "bean" type configuration.

Consequently, in each band, the metal cords arranged on the outside of the bend, with reference to the trajectory of the neutral axis, are subject to pulling force, while those in the axially opposite position, i.e. on the inside of the bend, are subject to compression.

In this situation, the cords of the bands may be able to withstand adequately the compressive stresses, without collapse as a result of the extreme load, only owing to the considerable cross-section of the band, resulting from the presence of at least two radially superimposed layers of cords.

However, the tire has a high vertical rigidity owing to the fact that these bands, formed by the said layers, are equivalent in practice to two non-deformable metal rims.

Moreover, the top portion of the tire has a sudden and high increase in rigidity, in the transition area between the sidewall zone and the tread zone, from the rigidity of the carcass structure to the rigidity of the belt structure, said increase being concentrated in the plane parallel to the equatorial plane in which the edge of at least one belt strip is aligned with that of the band.

This sudden increase in rigidity has a negative effect on the comfort of the tire.

The patent GB 2,064,445 also discloses a tire comprising bands applied onto the ends of a pair of belt strips, in which a third belt strip is arranged between the two layers of each band and a fourth belt strip covers the entire set of underlying strips.

In this solution, the presence of lateral bands formed by two individual layers of cords separated from one another by a belt strip results in a worse effect as regards the comfort since both the overall rigidity and the sudden increase in rigidity, in particular on the edges, are increased considerably, as a result of having increased the overall number of belt strips. Radial tires are also known, having a relative distance between the axially external portions of the belt strips in order to reduce the shearing deformations at the ends of the structure, as for example described in the patent U.S. Pat. No. 4,696,335 and in the patent application EP 0,719,659.

More particularly, the patent U.S. Pat. No 4,696,335 relates to a radial tire comprising a belt structure formed by a plurality of superimposed strips reinforced with metal cords inclined with respect to the circumferential direction.

The ends of the adjacent strips are separated from one another by means of the insertion of special rubber fillings. The belt structure described in this patent does not have any lateral bands with circumferentially directed reinforcing elements.

The patent application EP 0,719,659, in turn, describes a radial tire comprising a belt formed by two strips of rubberized fabric incorporating reinforcing elements inclined relative to the equatorial plane, and by two lateral bands formed by at least one layer with circumferential reinforcing elements.

The ends of the second strip are radially spaced from the ends of the first strip, i.e. the radially innermost one, and the width of the first strip is greater than that of the second strip.

Both the load-bearing strips have their central portion, delimited between the axially internal edges of the bands, extending in the radial direction outwards, assuming, in cross-section, a wave-like configuration with a point of inflection at each of said axially internal edges.

At the axially external edges of the bands the second strip has a further point of inflection, from which the divergence between the ends of the two belt strips commences.

In a particular embodiment, criticized by the same owner of the application for the inadequate fatigue resistance of the belt, the bands are formed by a single layer of metal cords: in this case the structural strength of the belt is recovered by reverting to the conventional solution with bands consisting of two superimposed layers of metal cords, where the second layer extends over the entire width of the belt.

The state of the art described does not offer any teaching useful for determining a belt structure which allows a reduction in the masses involved and the rigidity of the known metallic belts, in order to increase the comfort of the tire, reduce the weight and costs thereof and improve the tread moulding operation, while keeping at the same time unchanged, and possibly increasing, the operating performance.

The problem posed could not be solved on the basis of the teachings according to the state of the art since these showed that the elimination of a few belt strips, in order to achieve a reduction in weight, resulted in structures with an inadequate structural strength and/or worsened the behaviour of the tire during use, while the subdivision of the bands into a plurality of individual layers, in order to reduce the local rigidity, required an increase in the number of strips with inclined cords, with a consequent increase in the weight and the overall rigidity of the belt structure.

Moreover the axial displacement of the axial external edge of the band from the edge of the underlying strips so as to allow radial spacing between the ends of said strips, although reducing the shearing stresses due to the presence of a considerable quantity of rubber between these ends, results, owing to the centrifugal effect, at high speeds of travel, in an alternation in cyclical deformations of the ends of the belt strips protruding from the axially external end of the associated band, in particular the end of the second strip, said deformations being formed by radial expansions and successive contractions when passing under the impression zone, with a consequent reduction in comfort, noisiness and premature damage of the belt structure.

The Applicant has realized that the solution to the problem could be found in a new combination of features which are partly novel and partly individually known, in that they have been already adopted, separately from one another, for different and contrasting purposes; this new combination, consisting in a particular mutual arrangement of the adjacent belt layers and the bands with respect to the equatorial plane of the tire, provides a belt structure which is able, at the same time, to keep the ends of the belt strips in an unaltered or substantially unaltered position upon variation in the centrifugal forces occurring during use, protect the reinforcing elements of the bands from the effects of the compressive forces occurring in the impression area deformed in a "bean" shape, obtain a rigidity which is overall less than the usual value and gradually variable in the transition area from the side, where only the carcass ply is present, to the top portion, where the belt structure is present, and reduce the weight of the tire using a reduced number of strips.

SUMMARY OF THE INVENTION

According to a first aspect thereof, the invention therefore relates to a tire for vehicle wheels, comprising a torus-shaped radial carcass, a tread band situated at the top of said carcass and moulded with a pattern in relief having a plurality of grooves oriented in a varying manner with respect to the circumferential direction of said tire, and a belt structure arranged between carcass and tread, having an axial width substantially corresponding to that of the tread, said structure comprising a first belt strip, in a radially internal position, provided with reinforcing elements parallel to one another and inclined relative to the equatorial plane, a second belt strip radially superimposed on said first strip and provided with reinforcing elements parallel to one another and inclined relative to the equatorial plane in a direction opposite to those of the first strip, a pair of lateral bands radially superimposed on the ends of said second strip and symmetrically arranged with respect to the equatorial plane of said tire, each incorporating reinforcing elements oriented in a circumferential direction, characterized in that:

a) said second belt strip has an axial width smaller than that of the first strip and has its edges staggered axially inwards with respect to the corresponding edges of said first strip;

b) each band comprises a single layer of reinforcing elements which has its axially external edge staggered axially inwards with respect to the corresponding edge of said second strip;

c) a third belt strip, provided with reinforcing elements arranged parallel to one another and inclined with respect to the equatorial plane of the tire, is applied in a radially external position onto said belt structure and covers said lateral bands, said third strip having its edges staggered axially inwards with respect to the corresponding axially external edges of said bands.

Preferably said third belt strip covers the lateral bands over at least $2/3$ of their width.

Preferably first, circumferentially extending, elastomeric inserts are arranged between the ends of the first strip and the carcass, so as to space the ends of the first strip from the carcass by an amount gradually increasing until it reaches a predetermined value at the edges of the strip.

Advantageously, by way of alternative to or in combination with said spacing feature, it is envisaged that second, circumferentially extending, elastomeric inserts are arranged between the ends of the first and the second strip, so as to space the ends of the second strip from the first strip by an amount gradually increasing until it reaches a predetermined value at the edges of the second strip; moreover, preferably, the lateral end portions of the second strip are positioned according to a conical surface, coaxial with the axis of rotation of the tire, axially diverging outwards. More particularly, each band covers at least a portion of the respective diverging end portion of the second strip.

In a preferred embodiment, the axially external edge of each band is positioned at a radial height axially aligned with the corresponding edge of the third strip.

In a further preferred embodiment, in particular for steering tires, the edges of the third strip extend axially outwards with respect to the pair of end grooves of the tread.

BRIEF DESCRIPTION OF THE DRAWINGS

In any case the present invention will be understood more clearly with the aid of the following description and the accompanying figures provided solely by way of a non-limiting example, in which.

DETAILED DESCRIPTION OF THE INVENTION

Figure 1:
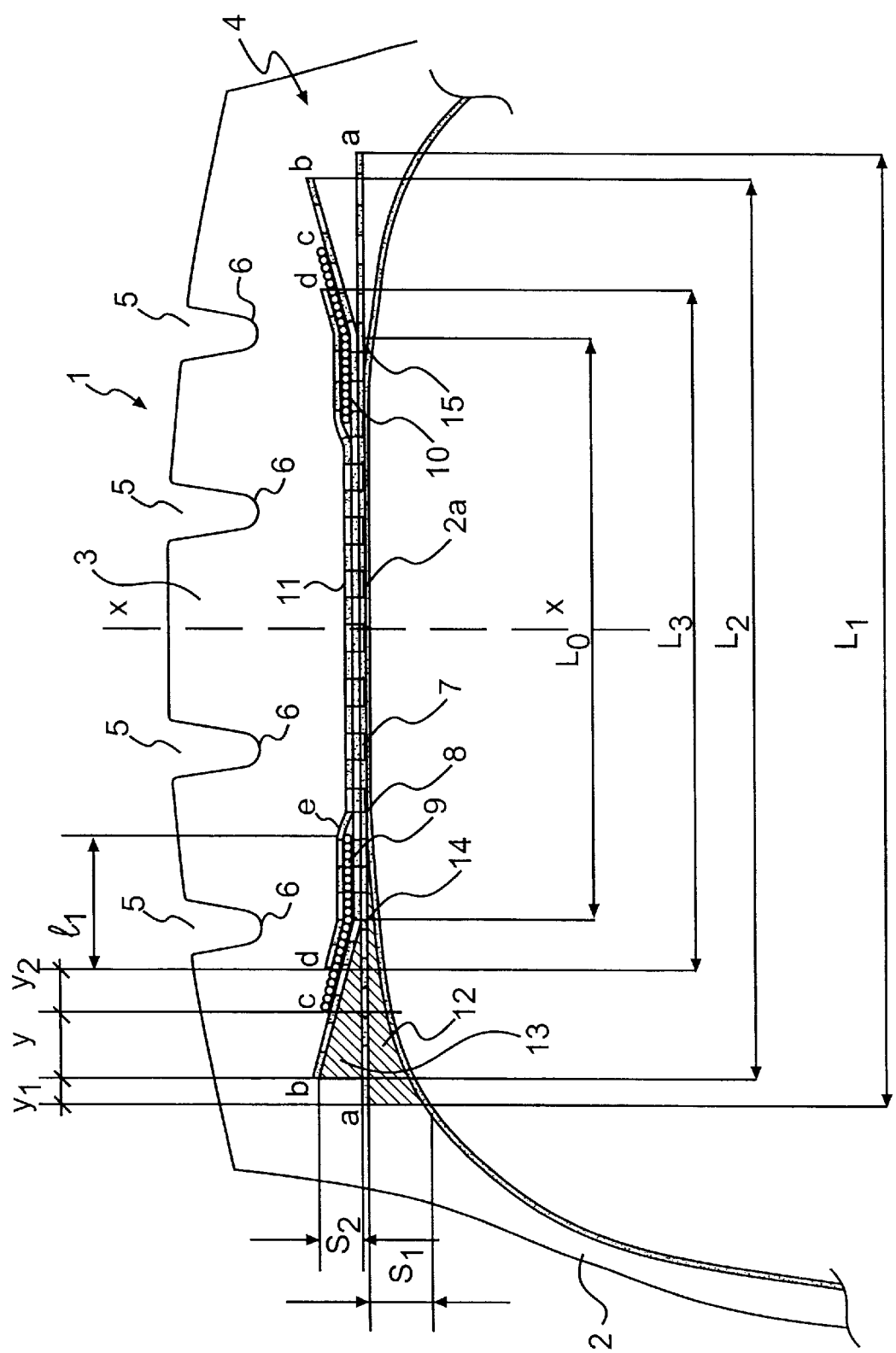
FIG. 1 shows in schematic form a transverse and partial section of the radially external portion of a tyre according to the invention.

In FIG. 1, 1 denotes a tire according to the invention, in particular manufactured in the size "295/80R22.5"; we would point out that "295" indicates the width of the tread expressed in millimeters, "80" indicates the value, multiplied by a hundred, of the ratio between the height of the tire cross-section and its maximum width, "R" indicates the radial structure of the carcass and "22.5" indicates the fitting diameter of the tire expressed in inches.

The tire 1 comprises a radial carcass 2, a tread band 3 located at the top of said carcass and a belt structure 4 located between carcass and tread. The carcass 2 comprises at least one rubberized ply 2a axially extending from bead to bead and incorporating a plurality of reinforcing cords which are advantageously metallic and lie in radial planes containing the axis of rotation of the tire.

The tread band 3 is moulded with a pattern in relief comprising a plurality of grooves 5 which are oriented in a varying manner with respect to the circumferential direction of the tire, but in particular are longitudinal, and the bottom surface of which is indicated by 6.

The belt structure 4 comprises two radially superimposed strips 7 and 8, respectively a first one and a second one from the radially innermost one, two lateral bands 9 and 10 arranged around the ends of the second strip, symmetrically with respect to the equatorial plane x—x of the tire, and a third strip 11 which is radially outermost.

The first and the second strip are formed by a rubberized fabric incorporating high-modulus reinforcing cords which are in particular metallic, with a breakage elongation of about 2.5% and in any case comprised between 2% and 3%.

The cords of the strip 7 are arranged parallel to one another and oriented at an angle preferably of between 10° and 30°, measured at the top relative to the equatorial plane of the tire; the cords of the strip 8, being also parallel to one another, are inclined in the opposite direction with respect to those of the first strip and, in a preferred embodiment, are advantageously arranged symmetrically with respect to said plane.

In the prototype described herein, the cords of the first strip have a formation 3×22+6×38; in other words each cord comprises a core of three steel wires with a diameter of 0.22 mm, which are helically wound together, surrounded by a ring of 6 wires with a diameter of 0.38 mm which are helically wound onto said core. The cord has a total diameter of 1.22 mm.

The angles of inclination of the cords have been chosen so that they are preferably equivalent to 24° and to 18° for the first strip and for the second strip, respectively.

The distance between the centre planes of the two strips (between the centres of corresponding cords of each strip) measured along the equatorial plane, is 2.1 mm.

These strips, owing to the forces which develop in the tire, in particular when running in bends and/or under the effect of axial thrusts, are known as "load-bearing" belt strips.

The lateral bands are formed by a strip of rubberized fabric incorporating reinforcing cords oriented parallel to the equatorial plane of the tire, with its circumferential ends being covered over a section with a breadth preferably not greater than 40 mm. These cords are preferably metal cords of the HE (high elongation) type with a breakage elongation value of between 4% and 10%, i.e. a value substantially greater than that of the cords of the load-bearing strips.

In the example of the embodiment described here, the cords of the bands have a formation of 3×7×20, i.e. each cord comprises three strands helically wound together, with a winding pitch of 6.3 mm, each strand being formed by 7 basic threads, each with a diameter of 0.20 mm and a winding pitch of 3.9 mm. The direction of winding of the threads in the strands and of the strands in the cord is always the same, while the winding pitches may be both different and the same. The individual cord has a diameter of 1.38 mm.

As an alternative to what is described, the aforementioned bands may be formed, in this case without being covered, by spiralling onto each end of the belt only one cord, or one ribbon comprising a number of cords (preferably from 2 to 15) in successive turns arranged axially alongside one another.

In other words, the lateral bands are each formed by a single strip of cords, or turns of cord, or ribbon of cords, with a total thickness of the strip equal to 1.8 mm.

The third strip comprises cords arranged alongside and parallel to one another and inclined with respect to the equatorial plane at an angle preferably of between 15° and 65°, intersecting or in the same direction as that of the cords of the adjacent strip, having the same or a different value.

The cords of the third strip may be both of the high-modulus type, such as those of the load-bearing strips, and of the high elongation type such as the HE type mentioned above in connection with the bands.

In the prototype described herein, the cords of the third strip are metal cords of the HE type inclined in the same direction as those of the second strip, with the same angle of inclination with respect to the equatorial plane.

The width of the belt structure corresponds to the axial width $L_1$ of the first strip, measured between its edges parallel to the axis of rotation of the tire.

Preferably, the maximum belt width is equal to about 95% of the width of the tread.

The second strip has a width $L_2$ less than that of the first strip so that its edges are staggered axially inwards by a predetermined quantity "$y_1$" relative to the corresponding edges of the first strip.

The value of "$y_1$" is preferably comprised between 5 and 20 mm and, in the example of embodiment illustrated, it is advantageously equal to 15 mm.

First, circumferentially extending, elastomeric inserts 12 are inserted between the two ends of the first belt strip and the underlying carcass ply, being tapered in the axial direction towards the equatorial plane of the tire and intended to space the edges of the first strip apart from the carcass ply by a predetermined amount, hereinbelow defined as "lower divergence" with a value "$S_1$", measured for each edge in a plane parallel to the equatorial plane "x—x" of the tire, passing through the end of the strip.

The value of the lower divergence "$S_1$" is preferably comprised in a range of values of between 2 mm and 15 mm, advantageously equal to 10 mm in the tire shown.

Preferably, as a result of the combination between the curvature of the carcass ply and the tapering of the inserts 12, the first belt strip is formed in the manner of a substantially cylindrical surface coaxial with the axis of rotation of the tire.

Similarly, by way of an alternative or in combination with the embodiment described above, second, circumferentially extending, elastomeric inserts 13 may be introduced between the ends of the two—first and second—strips, being tapered in the axial direction towards the equatorial plane of the tire and intended to space the edges of the second strip apart from the first strip by a predetermined amount, hereinbelow defined as "upper divergence", with a value "$S_2$", measured for each edge in a plane parallel to the equatorial plane of the tire passing through the end of the second strip.

Preferably said upper divergence value "$S_2$" is comprised between 1 and 15 mm and assumes in the prototype illustrated the value of 3 mm.

As a result of the combination between the preferred cylindrical form of the first belt strip and tapering of the inserts 13, the lateral end portions of the second belt strip are formed in the manner of a conical surface coaxial with the axis of rotation of the tire and axially diverging outwards.

It has been found to be advantageous in some embodiments of the tire to vary the characteristics of the rubber mixture for the fillings 12 and 13 as regards the associated hardness values and dynamic moduli.

More precisely, it has been found advantageous if the hardness measured in International Rubber Hardness Degrees (IRHD) and dynamic modulus values of the two mixtures are comprised in the following ranges:

|  | Insert 13 | Insert 12 |
| --- | --- | --- |
| Hardness (IRHD) | 60–90 | 45–65 |
| Dynamic modulus (Mpa) | 5.5–11 (at 100° C.) | 3–6 (at 70° C.) |

In particular, the dynamic moduli have been measured with the known instrument "Instron" according to the method used by the Applicant, whereby a cylindrical test-piece, 25 mm high, is subjected to a cyclical compressive deformation of 6%, with subsequent release, at a frequency of 100 Hz, after bringing up the aforementioned test-piece to a predetermined temperature.

For rubberized fabric mixtures (Insert 13) the diameter of the test-piece is 14 mm and the measurement temperature is 100° C., while for the filling mixtures (Insert 12), the diameter of the test-piece is 18 mm and the measurement temperature is equal to 70° C.

The width "$l_1$" of each band is preferably comprised between 5% and 40%, and even more preferably, between 10% and 25% of the maximum width $L_1$ of the belt.

Preferably, the axial external edge of each band is staggered axially inwards by a predetermined distance "y" with respect to the corresponding edge of the second belt strip.

Even more preferably, the distance "y" is able to assume a value of between 5 mm and 30 mm, and, in particular, in the example of embodiment described, is equal to 10 mm.

It has been found that the value of the upper divergence "$S_2$" may be advantageously associated with the value "y" by the following expression:

$$S_2 = 1 + (1/5)*(y)$$

In a preferred embodiment the second inserts 13 are introduced between the ends of the two strips so that the axially diverging end portions of the second strip delimit on said strip a substantially cylindrical central portion, comprised between a pair of points 14, 15, symmetrically arranged relative to the equatorial plane of the tire, with an axial width $L_0$.

Preferably each band is arranged on the second strip so as to cover the diverging end portion of said second strip by an amount constituting between 35% and 65% of the width of said end portion, preferably of the order of at least 50% of said width.

The axial width $L_3$ of the third strip is chosen so as cover said lateral bands over a portion equal to at least ⅔ of their axial length; preferably each edge of the third strip is located at a distance $Y_2$ from the axially external edge of the corresponding band comprised between 5 mm and 25 mm.

Preferably, the axial width $L_3$ of the third belt strip is greater than the distance $L_0$ between the starting points of the aforementioned diverging end portions, i.e. between the points 14 and 15.

In the preferred embodiment of the example described and illustrated herein, the tire has a first belt strip with a belt width $L_1$ equal to 210 mm, a second belt strip with a width $L_2$ equal to 180 mm and a third belt strip with a width $L_3$ equal to 145 mm.

Figure 2:
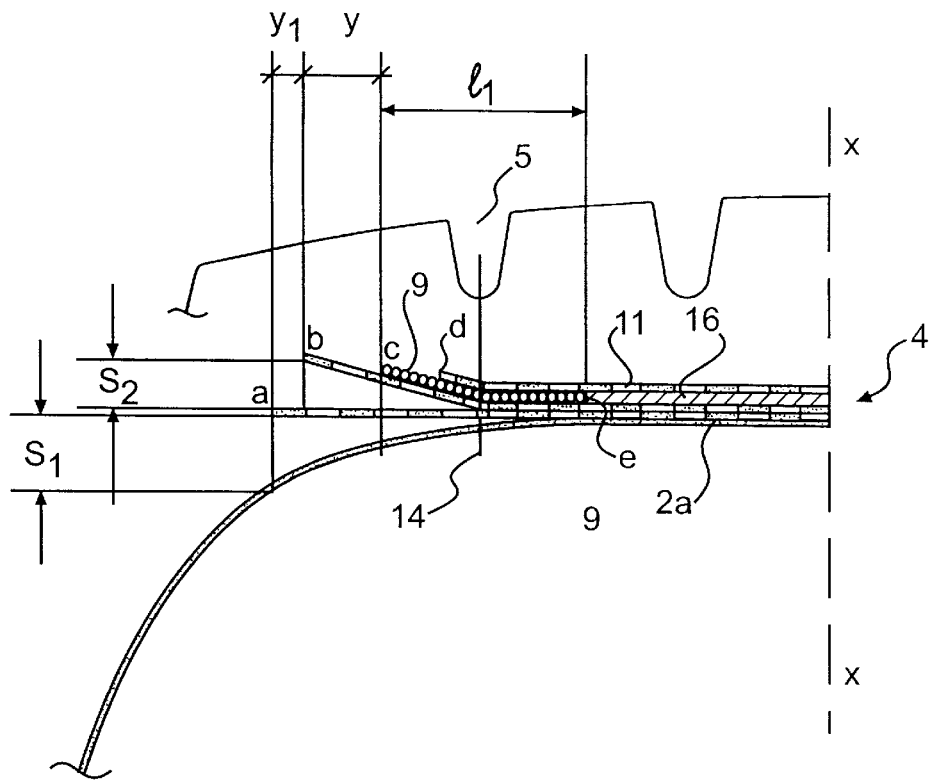
FIG. 2 shows a variation of the belt structure according to FIG. 1.

In a preferred embodiment illustrated in FIG. 2 it has been found convenient to insert between the two lateral bands 9, 10 a layer of rubber 16 intended to ensure advantageously uniform settling of the third strip around the belt assembly.

Figure 3:
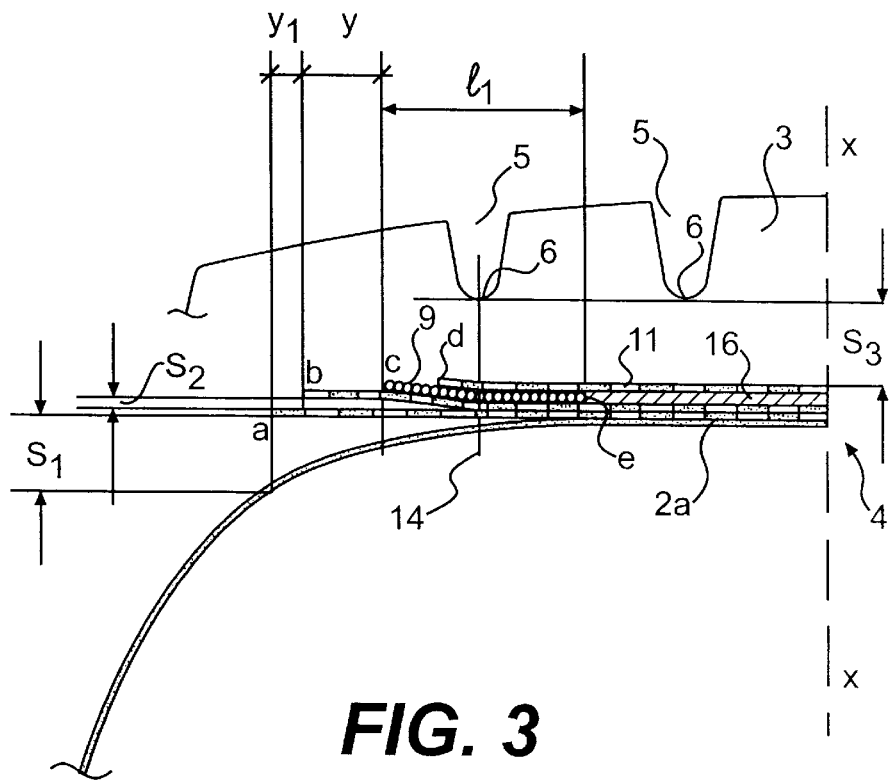
FIG. 3 shows a further variation with respect to FIG. 1.

In a different variation of the embodiment, illustrated in FIG. 3, the configuration of the belt is chosen so that the lower tapered insert 12 and the upper tapered insert 13 cause positioning of the axially external edge "c" of the band at a radial height axially aligned with the corresponding edge "d" of the third belt strip.

The aim of this configuration was to achieve, as shown in FIG. 3, a thickness "$S_3$" of mixture, having a practically uniform value, between a first line passing through the bottom 6 of the grooves 5 of the tread and a second line connecting the external edges of the lateral bands and lying on the third strip.

The tire according to the invention described and illustrated in FIG. 1 was subjected to comparative tests with known tires according to the state of the art, in which the belt comprises a pair of bands each formed by two radially superimposed layers of metal cords wound around a pair of belt strips with the axially external edge of the band aligned with the edge of the radially innermost strip as well as an additional strip arranged on top of the first two and between the internal edges of the bands.

The tests were carried out on two sets of tires of the same size, having an identical structure, except for that described with respect to the belt, being constructed with the same mixtures and with the same reinforcing elements.

In particular, the tire according to the invention had the following characteristics:
  lower divergence "$S_1$"=6 mm
  upper divergence "$S_2$"=3 mm
  distance "$S_3$" between groove bottom line and third strip=6 mm
  distance between the internal point "14" where the second strip starts to diverge and the internal edge "e" of the band=15 mm The test was carried out comparing two sets of tires, one set according to the invention, the other set according to the state of the art; each set was composed of 6 tires, two of which were mounted on the steering axle and four on the driving axle.

The test was carried out, after wearing-in the tires over a distance of about one thousand kilometers, along a varied route, which had alternating straight sections and sections with many bends, with different types of road surface and under different environmental conditions.

At the end of the test, the driver gave a rating as to the performance of the tires, with a standard-production tire. being assigned the value of 100.

The test, with reference to the two sets of tires, i.e. a set of known tires and a set of tires according to the invention, respectively referred to as TYPE 1 and TYPE 2, produced the following results:

| Tyre | TYPE 1 | TYPE 2 |
|---|---|---|
| Comfort | 100 | 150 |
| Centering along straight sections | 100 | 130 |
| Lateral stability | 100 | 130 |

It is considered that the notable improvement in the comfort depends on a variety of characteristics of the belt according to the invention.

The reduction in the metal band layers from two to one, although being without doubt one of the characteristics useful for reducing the vertical rigidity of the tire, must be considered in combination with other characteristics.

It must be noted, in fact, that the edges "a" and "b" of the first and second belt strip, the external edge "c" of the band and the edge "d" of the third belt strip are all staggered with respect to one another; in particular, the staggered arrangement between the said edges is chosen so that, passing from the external point on the shoulder of the tire towards the edge of the first strip aligned at this point, and from here to the third strip, a substantially uniform rigidity gradient is obtained.

This therefore results in a notable reduction of discontinuity in the vertical rigidity of the belt in the axial direction and this factor contributes substantially to improvement of the comfort conditions compared to known tires.

In addition to this, the third belt, with inclined metal cords, partially covers about ⅔ of the lateral bands so that its external edges "d" are also staggered relative to the internal edges "e" of the bands, improving further the gradual progression of the vertical rigidity, along the axial extension, of the entire belt assembly.

The abovementioned comparative tests have demonstrated an improvement in the tire according to the invention compared to that of the known type, also with respect to the lateral stability.

It can be assumed that the improvement depends, among the many possible causes, also on the fact that the band of circumferential cords is arranged between the second belt strip, which extends axially outwards beyond the band, and the portion of the third belt strip which covers, over at least ⅔ of its total width, the aforementioned band.

Consequently, in some particular travel conditions, for example in the situation where the impression area is deformed in the shape of a "bean", the cords at zero degrees inside the bend have a sufficient compression resistance since, being arranged between two reinforcing layers of cords which are inclined and mutually intersecting, their height of free inflection is reduced substantially.

Moreover, the layer of cords at zero degrees of the bands is protected by the forces acting in the direction parallel to the axis of rotation since, owing to their inclination with respect to the circumferential direction, the cords of the second and the third belt strips are able to absorb most of these forces.

For this reason, the tire according to the invention has a high degree of lateral stability also during travel conditions in which forces directed along the axis of rotation of the tire are generated.

This high lateral stability is further determined by the fact that the circumferential cords of the band give rise, together with the intersecting cords of the second and third belt strips, to a plurality of triangular-shaped structures characterized by a high mechanical strength.

In the Applicant's opinion, the improved lateral stability, in particular at high speeds, also depends on the presence of bands arranged so as to protect the divergence between the first and the second belt strip.

It can be considered, in fact, that, in the presence of high speeds of rotation of the tire, the belt action of the circumferential cords of the bands opposes effectively the action of the centrifugal force which tends to expand radially outwards the belt strips, in particular their ends, developing a notable radial contractive force inwards; consequently these ends, in particular those of the second strip, press on the elastomeric inserts radially inside them giving rise to a very high-strength, compact, rubber/metal assembly with respect to the forces directed along the axis of rotation.

This result may not be obtained when the bands are arranged around the second strip with their axially external edge in a position located axially inside with respect to the point where the second strip starts to diverge from the first strip.

In such a belt structure the effect of the centrifugal force may involve radial expansion of the ends of the second belt strip with a consequent variation in the lie of the associated metal cords and the angles of inclination of the said cords with respect to the equatorial plane, causing possible tearing and separation of the belt assembly, weakening in any case the resistance thereof to the forces directed along the axis of rotation of the tire.

A further advantage achieved by the invention lies in the fact that the possibility of having a thickness of elastomeric material "$S_3$" which is constant along the axial extension of the tread and which is preferably obtained by suitably selecting the divergence value between the first and the second load-bearing strip, results in an improved mouldability of the unprocessed carcass, to the advantage of the structural uniformity of the vulcanized tire, and contributes substantially to a gradual progression of the axial variation in the vertical rigidity of the top portion of said tire.

The invention also solves in a favourable manner the problem of cracking on the bottom of the longitudinal end grooves of the tread (those closest to the shoulders), which can be found in tires provided with the known belt structures.

In order to better clarify the problem, let us consider the belts according to the state of the art, in which the bands are arranged with their internal edge opposite the bottom of the aforementioned end grooves.

In these conditions, in the top portion of the tire, in the vicinity of these grooves, a circumferential hinging zone is created owing to the sudden change in the vertical rigidity from the belt portion with the band to the axially innermost, less rigid, belt portion, in combination with the reduced thickness of the elastomeric material in the position radially outside the edge of the band; in practice this hinge causes tears in the mixture at the bottom of the groove and may cause breakages in the underlying strips of inclined cords.

The problem is encountered in particular in travel or stop conditions where the tire is in contact with the ground with only the end portion of the tread.

The invention overcomes the problem since the band, formed by a single layer, reduces to a minimum the change in vertical rigidity with respect to the two underlying layers and the internal edge of each band is axially displaced inwards with respect to the corresponding end groove; as can be seen in FIG. 1, the band is essentially arranged in an underlying position, astride the bottom of the groove 6.

In particular, the invention is especially advantageous in the case of the tires for steering axles, where the problem of cracking at the bottom of the groove is particularly common since the tread pattern comprises zigzag or even straight circumferential grooves.

In these types of tires, in which the circumferential pattern of the grooves exacerbates the hinge effect, a solution according to the invention envisages that the third belt strip should have an axial width with a value preferably greater than the axial interdistance between the end grooves.

In this way the hinge effect of the circumferential grooves is greatly reduced, if not eliminated entirely, by the presence of the reinforcing elements of the third strip, the inclined arrangement of which with respect to the equatorial plane effectively opposes any folding of one belt part with respect to the other along circumferential lines.

The above considerations are confirmed in the results of a comparative test carried out on the tire according to the invention and a standard-production tire, referred to in the description of the previous test.

In order to assess the behaviour of the tires in connection with the problem mentioned, the Applicant has carried out a test consisting in making the tire in question, fitted to a vehicle under operating (load and pressure) conditions, follow a path during which the tyre mounts and dismounts fifty times a step, typically the pavement which borders the roadway: for an instant, during mounting, but in particular when descending from the step, the tire rests only on the shoulder bead, i.e. with a portion of the tread surface delimited between the shoulder and the immediately adjacent end groove, and the whole load acting on the tire is concentrated on this portion.

At the end of the test, the bottom of the axially outermost groove has cracks and cuts which are counted and the length of which and also, as far as possible, the width and depth of which are measured.

The tires according to the invention have demonstrated a considerable improvement consisting in an overall quantity of cuts (in terms of number and circumferential length) equivalent to only 25% of those present on the tire of the known type.

The tire according to the invention shows a marked improvement also with respect to tires according to the state of the art which are provided with a belt structure which comprises two bands applied onto the ends of a first load-bearing strip, a second load-bearing strip located between the internal edges of the bands and a further strip of inclined cords arranged so as to cover the entire the radially internal portion of the belt assembly.

This belt structure, independently of the position of the tread grooves and the number of layers of the bands, results in a marked variation in rigidity in the axial direction due to the unconnected zone existing between the internal edges of the bands and the adjacent edges of the second load-bearing strip.

This unconnected zone produces a circumferential hinging zone on the first load-bearing belt with consequent premature breakage thereof.

The belt according to the invention, which arranges the bands around both of the two load-bearing strips, as can be seen from FIG. 1, advantageously avoids the presence of the abovementioned hinge, as occurs instead in belt structures of the known type.

It should be noted that the advantageous result of greater structural strength of the belt (owing to its greater flexibility) in the tire according to the invention, compared to the belts in tires of the known type, has been obtained by adopting, for the various elements which form the belt, the mutual geometrical arrangement described and illustrated above, despite the use of single-layer bands and without increasing the width of the abovementioned bands compared to the known solutions. Moreover, the combining of a single-layer band with three belt strips provided with inclined reinforcing elements, according to the new combination illustrated in the present description, has enabled the weight of the belt assembly to be reduced, improving at the same time the performance of the tire according to the invention compared to those of the state of the art.

What is claimed is:

1. Tire for vehicle wheels, comprising a torus-shaped radial carcass, a tread band situated at the top of said carcass and moulded with a pattern in relief having a plurality of grooves oriented in a varying manner with respect to the circumferential direction of said tire, and a belt structure located between carcass and tread band, having an axial width substantially corresponding to that of the tread band, said structure comprising a first belt strip, in a radially internal position, provided with reinforcing elements parallel to one another and inclined relative to the equatorial plane, a second belt strip radially superimposed on said first strip and provided with reinforcing elements parallel to one another and inclined relative to the equatorial plane in a direction opposite to those of the first strip, a pair of lateral bands radially superimposed on the ends of said second strip and symmetrically arranged with respect to the equatorial plane of said tire, each band incorporating reinforcing elements oriented in a circumferential direction, wherein:

said second belt strip has an axial width less than that of the first strip and has its edges staggered axially inwards with respect to the corresponding edges of said first strip;

each band comprises a single layer of reinforcing elements which has its axially external edge staggered axially inwards with respect to the corresponding edge of said second strip;

a third belt strip, provided with reinforcing elements arranged parallel to one another and inclined with respect to the equatorial plane of the tire, is applied in a radially external position onto said belt structure and covers said lateral bands, said third strip having its edges staggered axially inwards with respect to the corresponding axially external edges of said bands.

2. Tire according to claim 1, wherein said third strip covers the lateral bands over at least ⅔ of their axial width.

3. Tire according to claim 2, wherein each edge of said third strip is located at an axial distance included between 5 mm and 25 mm from the axially external edge of the corresponding band.

4. Tire according to claim 1, wherein said reinforcing elements of the third strip are cords inclined at an angle included between 15° and 65°, measured at the top of the tire, with respect to the equatorial plane.

5. Tire according to claim 4, wherein said reinforcing elements are cords of the high elongation (HE) type, inclined in the same direction as the cords of the adjacent strip.

6. Tire according to claim 1, wherein first, circumferentially extending, elastomeric inserts are arranged between the ends of said first strip and the carcass, said first inserts spacing the ends of the first strip apart from the carcass by a gradually increasing quantity axially outwards until it reaches a predetermined value $S_1$ at the edges of said first strip.

7. Tire according to claim 6, wherein said value $S_1$ is comprised between 2 mm and 15 mm.

8. Tire according to claim 6, wherein said first elastomeric inserts have an IRHD hardness value included between 45 and 65.

9. Tire according to claim 6, wherein said first elastomeric inserts have a dynamic modulus value, measured at 70° C., included between 3 and 6 MPa.

10. Tire according to claim 1, wherein second, circumferentially extending, elastomeric inserts are arranged between the ends of said first and second strip, said second inserts spacing the ends of the second strip apart from the first strip by a gradually increasing quantity axially outwards until it reaches a predetermined value $S_2$ at the edges of said second strip.

11. Tire according to claim 10, wherein said value $S_2$ is comprised between 1 and 15 mm.

12. Tire according to claim 10, wherein said second elastomeric inserts arrange the lateral end portions of said second strip according to a conical surface coaxial with the axis of rotation of the tire and axially diverging outwards, said bands covering at least a portion of said diverging end portions of the second strip.

13. Tire according to claim 12, wherein each band covers the corresponding diverging end portion of the second strip over a section included between 35% and 65% of the axial width of said end portions.

14. Tire according to claim 10, wherein said second elastomeric inserts have an IRHD hardness value included between 60 and 90.

15. Tire according to claim 10, wherein said second elastomeric inserts have a dynamic modulus value, measured at 100° C., included between 5.5 and 11 MPa.

16. Tire according to claim 1, wherein said reinforcing elements of the bands are high elongation metal cords.

17. Tire according to claim 16, wherein said bands comprise a single cord wound in successive turns arranged axially alongside one another.

18. Tire according to claim 16, wherein said bands each comprise a strip of 2 to 15 cords, the strip being wound in successive turns arranged axially alongside one another.

19. Tire according to claim 1, wherein the axial distance between the axially external edge of the band and the corresponding edge of the second strip is comprised between 5 and 30 mm.

20. Tire according to claim 1, wherein the width of each band is comprised between 5% and 40% of the maximum width $L_1$ of the belt.

21. Tire according to claim 1, wherein the axially external edge of the band is positioned at a radial height axially aligned with the corresponding edge of the third strip.

22. Tire according to claim 1, wherein said plurality of grooves present on the tread band comprises longitudinally arranged grooves and that the edges of the third strip extend axially outwards beyond the axially outermost longitudinal grooves.

23. Tire according to claim 22, wherein the axially internal edges of the bands extend axially inwards beyond the axially outermost longitudinal grooves.

24. Tire according to claim 1, wherein it has a substantially uniform mixture thickness comprised between a first line passing through the bottom of the grooves of the tread band and a second line connecting the axially external edges of the lateral bands and lying on the third strip.

25. Tire according to claim 1, wherein layer of rubber is inserted between the two lateral bands, in a position radially inside said third belt strip.

\* \* \* \* \*